July 6, 1954  R. C. BROOKS  2,683,045
PIPE HANGER AND SEAL ASSEMBLY
Filed March 30, 1950  2 Sheets-Sheet 1
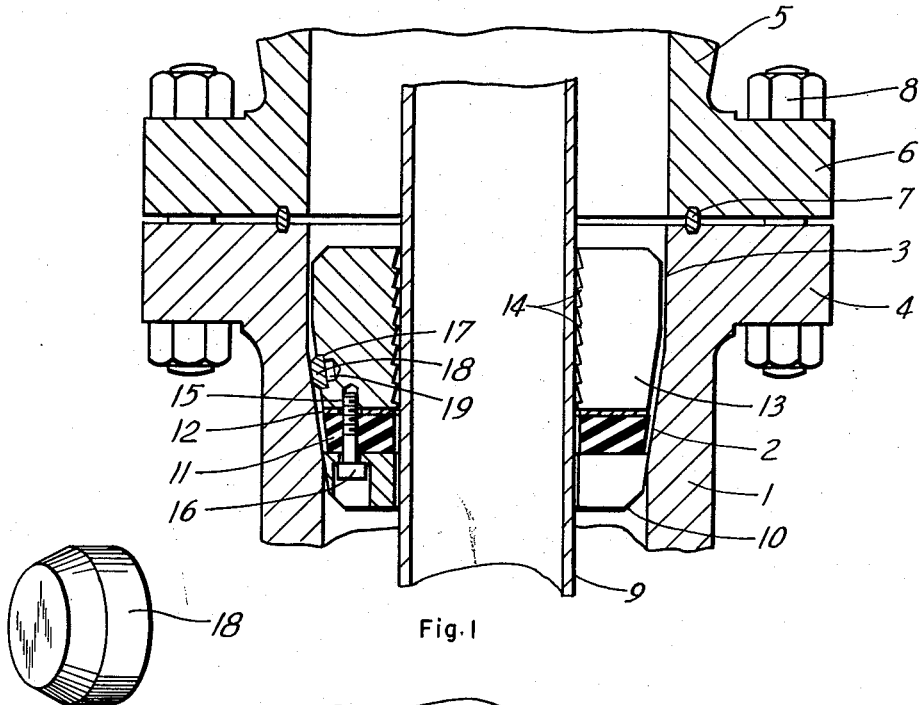
Fig. 1
Fig 3
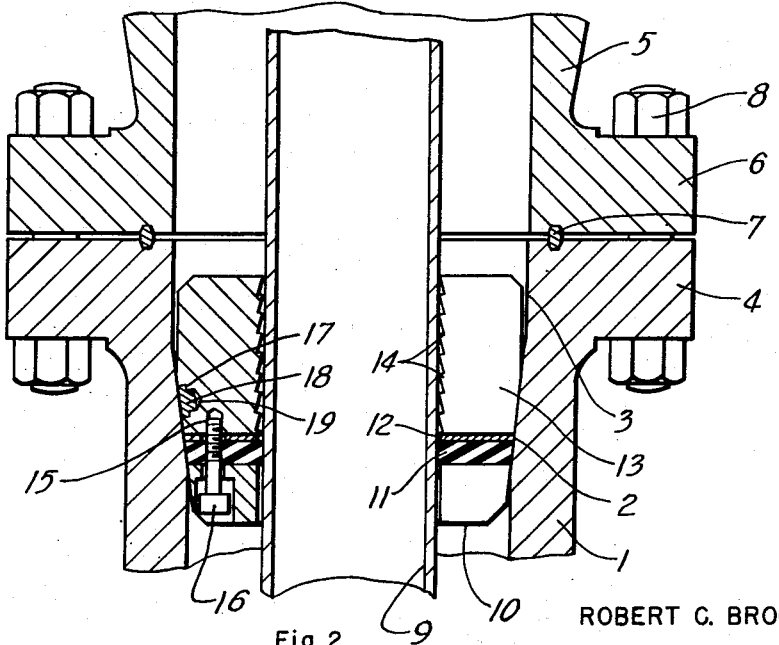
Fig 2
ROBERT C. BROOKS
INVENTOR.
BY Browning & Simms
Attorneys July 6, 1954 R. C. BROOKS 2,683,045
PIPE HANGER AND SEAL ASSEMBLY
Filed March 30, 1950 2 Sheets-Sheet 2

ROBERT C. BROOKS
*INVENTOR.*

Patented July 6, 1954

2,683,045

UNITED STATES PATENT OFFICE 2,683,045

PIPE HANGER AND SEAL ASSEMBLY

Robert C. Brooks, Houston, Tex., assignor to Cameron Iron Works, Inc., Houston, Tex., a corporation of Texas Application March 30, 1950, Serial No. 152,907

16 Claims. (Cl. 285—22)

This invention relates in general to pipe hanging and sealing apparatus and has for its general object the provision of such an apparatus which will become fully and automatically effective upon being lowered into position about a pipe and the weight of the pipe released thereon.

It is often desirable in completing a well to hang and provide a seal about the outside of an inner string of pipe prior to the removal of the control equipment, such as blowout preventers and the like, which are customarily employed on a well above the casing or tubing head. Various means have in the past been proposed for performing this function, but such means have either required special types of casing or tubing heads, which, unless the operator had foreseen the necessity for the particular type of hanging and sealing device employed, would probably not be in place on the well, or have required that the pipe be hung at a collar or special section of pipe which would provide a downwardly facing shoulder on the exterior of the pipe. In still other instances, suggestions have involved the provision of a tapered bowl forming part of the mechanism separate from the casing or tubing head, and such a bowl as will be appreciated is an expensive item to manufacture.

In those previous devices which have purported to provide seals automatically upon hanging of the pipe, some have provided for the entire weight of the pipe to rest on the seals to expand the same, a situation which in some cases may result in damage to the pipe being hung; and other such devices have relied upon what is customarily known as a lip type seal, which is not always reliable.

It is an object of this invention to provide a device of the type referred to which will not require any special well head equipment other than the hanging and sealing device itself, and will not require any special element to be incorporated in the pipe nor require the pipe to be hung at any specified point.

Another object is to provide a pipe hanger and seal assembly which may be placed about a pipe to be hung in a tapered casing or tubing head, lowered through well control equipment such as blowout preventers and valves and caused to both hang the pipe and seal off the space about the pipe with a pressure seal.

Another object is to provide a device of the type referred to in which the pressure applied to the packing to expand the same may be limited.

Another object is to provide a device of the type referred to in which the packing will be expanded by the weight of the pipe but in which only part of the weight of the pipe will be used against the packing and the remainder will be transmitted directly from the pipe through relatively rigid support members to the casing head or tubing head.

Another object is to provide such device which may be placed around a pipe, the ends of which are inaccessible.

It is another object to provide a pipe or rod hanger in the form of slip segments which will be caused to engage a pipe to grip the same before becoming rigidly seated in the slip bowl and which will be initially seated in the slip bowl yet be permitted to move further downwardly after such initial seating, it being appreciated that such a hanger may be useful other than in combination with a packing assembly as herein specifically disclosed.

It is also an object to provide an individual slip capable of initial seating and gripping engagement and of further movement after such engagement, such slip being useful in other situations than as part of a pipe or rod hanger.

Other objects and advantages of this invention will become apparent from the following description taken in connection with the accompanying drawings wherein is set forth by way of illustration and example one embodiment of this invention.

In the drawings:

Figure 1 is a view illustrating in longitudinal cross section a pipe being hung and a tapered bowl type casing head of ordinary construction in which it is being hung, the pipe hanger and seal assembly being illustrated in longitudinal cross section, and the parts occupying the position which they would assume immediately upon the pipe hanger and seal assembly reaching its position in the casing head and prior to the actual hanging of the casing and the formation of the seal.

Figure 2 is a view similar to Figure 1, but showing the parts in position they will occupy when the pipe has been completely hung and the seal effected.

Figure 3 is an enlarged perspective view of one of the yieldable parts carried by the slip segments illustrated in Figures 1 and 2.

Figure 4:
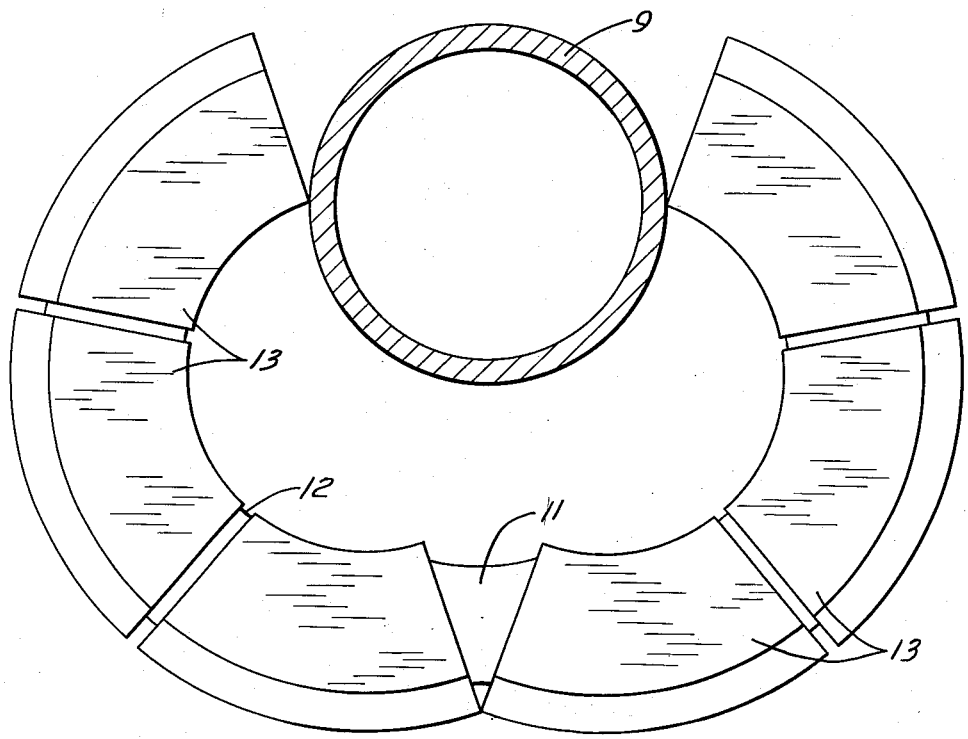
Figure 4 is a plan view of a pipe hanger and seal assembly such as shown in Figures 1 and 2, being placed around a pipe to be hung, the pipe being shown in horizontal cross section.

Referring now more in detail to the drawings, the numeral 1 indicates a casing head of conventional construction having a tapered zone 2 on its interior, such taper converging in a downward direction, and having a substantially cylindrical zone 3 on its interior above the tapered zone 2. This casing head is provided with a flange 4 extending outwardly from its upper end for the purpose of securing it to a suitable fitting to be connected thereto, the lower portion of such fitting being indicated by the numeral 5 in Figures 1 and 2. The fitting 5 may be a blowout preventer, valve, or other suitable connection, and is provided with a flange 6 matching the flange 4 on the casing head. Between these two fittings, the casing head 1, and the fitting 5, there is interposed a customary type seal ring 7 so that when the flanges 4 and 6 are drawn together by bolts 8, the two fittings will be completely sealed to each other.

Located within the casing head 1 and to be hung in such head and sealed thereto is a pipe 9 which may be an inner string of well casing and which may extend upwardly from the casing head through suitable control equipment such as blowout preventers, valves, and the like.

The hanging and sealing assembly to which this invention relates is made up of a packing holding ring 10, an annular distortable packing 11, a packing compressing ring 12, and a ring of slip segments 13.

The packing holding ring 10 is illustrated as having a tapered exterior surface adapted to seat in the lower portion of the tapered zone 2 of the casing head 1, and provide a solid support against which the distortable packing 11 may be compressed. The slip segments 13 are likewise provided with tapered outer surfaces to fit in the upper portion of the tapered zone 2 of the casing head, and on their inner surfaces are provided with upwardly directed gripping teeth 14 adapted to engage and grip the pipe 9.

Each of the segments 13 is tapped in its lower surface at 15 to receive a cap screw 16 or the like, which passes through the holding ring 10 and the distortable packing 11, as well as the packing compressing ring 12, so as to secure all these parts together in a unitary assembly. The packing holding ring 10 and compressing ring 12 provide a packing confining means by which the packing 11 is confined.

Each of the segments 13 is also provided on its outer surface with one or more recesses 17 adapted to receive lugs 18 of material softer than the material of the segments themselves, such lugs projecting outwardly from the outer surfaces of the segments and providing yieldable parts adapted to yield under pressure toward the regular outer contour of the segments. Inwardly of the recesses 17 each of the segments is provided with a relief recess 19 so that when pressure is applied to the yieldable material of the lugs 18, such material may flow back into the relief recess 19.

The packing holding ring 10 and the packing compressing ring 12 are both made in two parts which complement each other to form these respective annular rings. These parts are split from each other in a longitudinal direction so that each makes up substantially one-half of an annular member. The distortable packing 11 is likewise split but only at one point, so that it consists of one integral flexible or distortable packing member. When the parts are assembled, one-half of the segments 13 are assembled with respect to one of the halves of the packing compressing ring and one of the halves of the packing holding ring, and the other half of the segments are assembled with respect to the other half of the packing compressing ring and the other half of the packing holding ring. The annular distortable packing is so arranged that its one split portion registers with one of the divisions between the packing compressing ring parts and the packing holding ring parts, whereas this annular distortable packing bridges the other split or division between the packing compressing ring parts and the packing holding ring parts. It will be seen that when all the parts are secured together as by the cap screws 16, the two segmental halves of the assembly will be joined together only at one side and only by the distortable packing which bridges the split between them. This distortable packing being relatively easy to flex as compared with the other parts of the assembly, may be made to serve as a hinge so that the two parts of the assembly may be moved away from each other and placed around a pipe as illustrated in Figure 4.

It will be appreciated that the cap screws 16 are not tightened sufficiently to expand the distortable packing 11 but are merely for the purpose of holding the parts in assembled relation while they are being put in position in the well.

In explaining the operation it will be assumed that the pipe 9 is an inner casing which has been run into a well through blowout preventers and other control equipment, and has reached the position where it is desired that it be hung and sealed. It will further be assumed that the well is in such condition that it is not desired that the space between the casing and casing head be left open for any substantial length of time because of the danger of a blowout.

While the pipe 9 is being held in suspension by the hoisting apparatus employed in running the pipe, the assembly constructed in accordance with this invention as above described will be placed about an intermediate portion of the pipe above the blowout preventers in the manner illustrated in Figure 4. The blowout preventers will then be opened so as to permit this assembly to pass down along the pipe and land in the casing head as illustrated in Figure 1. It will be seen that when the parts are in the position illustrated in Figure 1, the packing holding ring or gland 10 will have landed in the tapered zone of the casing head near the lower end thereof so as to stop further downward movement of the assembly, and particularly of the packing 11. Also, the yieldable lugs 18 on the outer surfaces of the slip segments will have come in contact with the upper portion of the tapered zone and forced the teeth 14 of these segments into contact with the pipe 9.

The weight of the pipe 9 will then be eased off from the hoisting equipment and as this weight is taken on the slip segments 13, these segments will begin to move downwardly, first biting into the pipe with the teeth 14, and then forcing the yieldable lugs 18 to move inwardly toward the regular outer contour of the segments, these lugs becoming distorted into the relief recesses 19 as shown in Figure 2. During this downward movement also the segments 13 will move the packing compressing ring 12 downwardly and compress the packing in a longitudinal direction causing it to expand laterally into sealing engagement with both the casing head 1 and the pipe 9.

It will be seen that the amount of compression of the packing will be limited by the fact that as soon as the yieldable projections have been moved inwardly to the regular contour of the segments 13, the downward movement of the segments will be halted and that any additional weight of the pipe which is brought to rest on the segments will be transmitted directly by the segments to the casing head 1 and will not be impressed upon the packing 11. Thus, the amount of downward movement of the segments permitted by the yielding of the yieldable lugs 18 determines the degree to which the packing 11 will be compressed and the amount of weight to be placed on this packing.

After the device has been set in the manner just described, it will be appreciated that not only is the pipe hung, but that the space between the pipe and the casing head will be completely sealed off. Thereupon, the control equipment may be removed from the well without danger of blowout through the annular space and the well may then be completed in the usual manner.

It is apparent that various modifications may be made in the device as described without departing from the spirit or scope of this invention as defined in the appended claims.

The invention having been described, what is claimed is:

1. A pipe hanger and seal assembly comprising, an annular distortable packing, a packing holding ring engaging one side of said packing, a packing compressing ring engaging the opposite side of said packing, said holding ring having parts engageable with means opposing its movement in a direction away from said packing, a ring of slip segments with pipe engaging portions and having parts in engagement with said compressing ring to move said compressing ring axially toward said holding ring and compress said packing with movement of said slips toward and opposing supporting means therefor in a well head in which the assembly is to be landed, and yieldable parts carried by said slip segments and initially projecting from the outer surfaces thereof for engagement with means in said well head to urge said segments inwardly and then movable under pressure toward conformity with the regular outer contours of said segments as the segments move toward the supporting means therefor to permit the segments to move further after the initial engagement of the yieldable parts with the well head surface, said slip segment parts in engagement with said compressing ring being independent of the means for engagement by said yieldable parts.

2. A pipe hanger and seal assembly comprising a pair of annular gland rings, a distortable packing between and confined against endwise flow by said gland rings, a ring of slip segments comprising wedges having one surface adapted to engage a pipe to be suspended by the assembly and another surface inclined relative to the first surface and exposed to seat against a well head from which the pipe is to be suspended and limit movement of the pipe relative to the well head in one direction, yieldable initial seating means carried by at least some of said wedges and projecting from said exposed surface of such wedges and beyond the regular outer contour of said exposed surface of such wedges to provide an initial yieldable engagement of such wedges with the well head, said segments having a force transmitting connection with one of said rings so that movement of said segments toward seated position in said well head after such initial engagement of the yieldable initial seating means with the well head will move said one ring toward the other ring and compress the packing, and the other of said rings having parts engageable with means opposing its movement in a direction away from said packing while said packing is being compressed.

3. A pipe hanger and seal assembly comprising a packing holding ring, an annular distortable packing thereon, said holding ring having a seating surface engageable with a corresponding surface in a well head to oppose its movement in a direction away from said packing, a packing compressing ring engaging the opposite side of said packing from said holding ring, a ring of slip segments with pipe engaging portions and having parts in engagement with said compressing ring to move said compressing ring axially toward said holding ring with movement of said segments into a slip bowl in said well head, and yieldable parts carried by said slip segments and initially projecting from the outer surfaces thereof to engage said slip bowl and then movable under pressure toward conformity with the regular outer contours of said segments to permit the latter to move further into said bowl after said initial engagement, said rings and packing being split longitudinally to permit them to be placed about a pipe, the end of which is inaccessible.

4. A pipe hanger and seal assembly comprising a packing holding ring, an annular distortable packing thereon, said holding ring having a seating surface engageable with a corresponding surface in a well head to oppose its movement in a direction away from said packing, a packing compressing ring on and engaging the opposite side of said packing from said holding ring, a ring of slip segments with pipe engaging portions and having parts in engagement with said compressing ring to move said compressing ring axially toward said holding ring with movement of said segments into a slip bowl in said well head, and yieldable parts carried by said slip segments and initially projecting from the outer surfaces thereof to initially engage said slip bowl and then movable under pressure toward conformity with the regular outer contours of said segments to permit the latter to move further into the bowl after said initial engagement, said rings being split longitudinally at two points along their circumferences to permit them to be separated and placed about a pipe, the end of which is inaccessible, and said packing being split longitudinally at one point, and means securing said segments to said rings and packing with the split in said packing registering with one of the splits in each of said rings, whereby said packing will serve as a hinge between the respective portions of the assembly.

5. A pipe hanger and seal assembly comprising a packing holding ring, an annular distortable packing thereon, a packing compressing ring engaging the opposite side of said packing from said holding ring, a ring of slip segments with pipe engaging portions and having parts in engagement with said compressing ring to move said compressing ring axially toward said holding ring and compress said packing with movement of said segments toward a supporting surface therefor in a casing head, and yieldable parts carried by said slip segments and initially projecting from the outer surfaces thereof for engagement with said casing head and then movable under pressure toward conformity with the regular outer contours of said segments to permit the latter to move further downward toward the supporting surface therefor in the casing head after said initial engagement, said holding ring having a downward seating surface adapted to seat rigidly in the casing head, the axial spacing between said seating surface and said yieldable parts being such that the holding ring is seated and said packing is compressed during at least a portion of the inward movement of the yieldable parts.

6. A pipe hanger and seal assembly comprising a packing holding ring with a portion seatable in a well head in which the assembly is to be landed, an annular distortable packing thereon, a packing compressing ring confining the opposite side of said packing from said holding ring, a ring of slip segments with pipe engaging portions and having parts in engagement with said compressing ring to move said compressing ring axially toward said holding ring and compress said packing with movement of said segments toward a supporting surface therefor in said well head, and yieldable parts carried by said slip segments and initially projecting from the outer surfaces thereof to engage a surface on said well head and then movable under pressure toward conformity with the regular outer contours of said segments to permit the latter to move further toward said supporting surface after said initial engagement, said yieldable parts comprising lugs of material softer than the material of said slip segments.

7. A pipe hanger and seal assembly comprising a packing holding ring with a portion engageable with a well head in which the assembly is to be landed, an annular distortable packing thereon, a packing compressing ring confining the opposite side of said packing from said holding ring, a ring of slip segments with inner pipe engaging surfaces and having parts in engagement with said compressing ring to move said compressing ring axially toward the holding ring with movement of said segments toward a supporting surface therefor in said well head, and yieldable parts carried by said slip segments and initially projecting from the outer surfaces thereof to initially engage said supporting surface and then movable under pressure toward conformity with the regular outer contours of said segments to permit the latter to move further toward such supporting surface after said initial engagement, said yieldable parts comprising lugs mounted in recesses in said segments and yieldable to move further into said recesses under pressure.

8. A pipe hanger and seal assembly comprising a packing holding ring having a downward seating surface adapted to seat rigidly in a casing head, an annular distortable packing thereon, a packing compressing ring confining the opposite side of said packing from said holding ring, a ring of slip segments with inner pipe engaging surfaces and outer surfaces engageable with a slip bowl in the casing head to limit downward movement into the bowl and further having parts in engagement with said compressing ring to move said compressing ring axially toward the holding ring with movement of said segments downward into said bowl, yieldable parts carried by said slip segments and initially projecting from the outer surfaces thereof to engage said bowl and then movable under pressure toward conformity with the regular outer contours of said segments to permit the latter to move further downward into the bowl after said initial engagement, said segments each having a recess in its outer surface and a relief recess of smaller cross section than said first recess extending from said first recess, and said yieldable parts comprising lugs of material seated and retained in said first recesses respectively and yieldable into said relief recesses under pressure.

9. A pipe hanger and seal assembly comprising a pair of gland rings, an annular distortable packing between said rings, a ring of slip segments secured to and adjacent said rings, each of said segments having an outwardly projecting yieldable parts adapted to engage a slip bowl initially and then yield under pressure to permit said segments to move further into such bowl after such initial engagement, and each segment having also a relatively unyieldable outer part adapted to engage a slip bowl after a predetermined amount of such further movement and limit the same, said segments having a force transmitting connection with one of said rings and independent of said slip bowl so that movement of said segments into said slip bowl after such initial engagement will move such ring toward the other ring and compress the packing, and the other of said rings having parts engageable with means for opposing its movement with said segments.

10. A pipe hanger and seal assembly comprising a plurality of slip segments, pipe engaging teeth on the inner face of said slip segments, yieldable elements extending radially outwardly from said slip segments and adapted to make initial contact with a slip bowl to set said teeth against a pipe, packing confining means carried by said slip segments for confining a packing against endwise flow, an annular distortable packing so confined by said packing confining means, said confining means comprising packing holding means adapted for support from a part of a slip bowl, packing compressing means, and a force transmitting connection between said slip segments and said packing compressing means independent of said slip bowl so that movement of said slip segments into said slip bowl also moves said packing compressing ring along the slip bowl to reduce the volume of the space within said packing confining means, whereby said packing will be caused to expand radially into sealing engagement with a pipe passing therethrough.

11. A pipe hanger and seal assembly comprising a packing holding ring having a surface engageable with means for opposing downward movement of the holding ring, an annular distortable packing on the holding ring, a packing compressing ring on the opposite side of said packing from said holding ring, a ring of slip segments movable with respect to the holding ring and having a force transmitting connection with said compressing ring to move said compressing ring axially toward the packing holding ring and compress said packing with movement of the slips in a downward direction, said slips having an outer seating surface sloping upwardly and outwardly beyond the outer circumference of said packing ring for engagement with a slip support, and yieldable parts disposed in said seating surface and initially projecting from said surface to engage said slip support and movable under pressure toward conformity with said surface to permit said slips to move further downward relative to such slip support and the holding ring after such initial engagement, said force transmitting connection being independent of said slip support.

12. The assembly of claim 11 wherein said force transmitting connection of the slip segments with said compressing ring is formed by abutting the slip segments against the compressing ring.

13. A pipe hanger and seal assembly comprising a packing holding ring having a seating surface for seating on a support, an annular distortable packing on said holding ring, a packing compressing ring on the opposite side of said packing from said holding ring, a plurality of slip segments with an outer seating surface for engagement with a support means therefor, said outer seating surface of the slip segments being disposed radially outward from the central axis of said packing ring a greater distance than is the seating surface of said packing holding ring, a force transmitting connection between said slip segments and said compressing ring independent of said support means for the slip segments so that movement of the slip segments toward seating engagement with said support means moves the compressing ring toward the holding ring and compresses the packing, and yieldable parts disposed in and initially projecting from the seating surface of said slip segments to provide an initial yieldable seating engagement for said segments with said support means therefor and movable under pressure toward conformity with said outer seating surface of the slip segments to permit such slips to move after such initial engagement.

14. A pipe hanger and seal assembly comprising a packing holding ring having a surface to be engaged by a support and have its movement toward one side opposed, an annular distortable packing on the other side of the holding ring, a packing compressing ring on the opposite side of said packing from said holding ring, a ring of slip segments movable with respect to said holding ring and having inner pipe engaging portions and outer tapered seating portions engageable with a slip bowl, said slip segments having parts independent of said slip bowl in engagement with said compressing ring to urge same toward said holding ring so as to compress said packing, and parts projecting from said tapered portions for engagement with the slip bowl and being more yieldable than said tapered portions to cause engagement of said pipe engaging portions with a pipe prior to seating of said tapered portions in the slip bowl.

15. In a slip, a substantially rigid segment having an inner pipe engaging portion and an exposed outer tapered seating portion, and a yieldable initial seating part projecting from an intermediate part of said tapered seating portion which initial seating part is yieldable under pressure toward the regular outer contour of said tapered portion to provide initial yieldable seating of said segments.

16. A slip comprising a wedge having one surface adapted to engage and move with one of two relatively moveable members and another surface inclined relative to the first and exposed to seat against the other of said relatively moveable members and limit movement to the two members relative to each other in one direction, and yieldable initial seating means projecting from said exposed surface and beyond the regular outer contour of said exposed surface of the wedge to provide initial yieldable engagement of said slip with such second member.

References Cited in the file of this patent

UNITED STATES PATENTS

| Number | Name | Date |
|---|---|---|
| 1,650,074 | Kammerdiner | Nov. 22, 1927 |
| 1,774,196 | Davis | Aug. 26, 1930 |
| 1,923,283 | Stokes | Aug. 22, 1933 |
| 2,073,890 | Tschappat | Mar. 16, 1937 |
| 2,118,094 | McDonough et al. | May 24, 1938 |
| 2,194,265 | Abercrombie | Mar. 19, 1940 |
| 2,312,487 | Roach et al. | Mar. 2, 1943 |
| 2,387,610 | Roach | Oct. 23, 1945 |
| 2,462,596 | Bent | Feb. 22, 1949 |
| 2,493,556 | Stone | Jan. 3, 1950 |
| 2,532,662 | Eckel | Dec. 5, 1950 |
| 2,553,838 | Allen et al. | May 22, 1951 |
| 2,600,257 | Neilon | June 10, 1952 |
| 2,610,689 | Eckel | Sept. 16, 1952 |
| 2,620,880 | Mueller et al. | Dec. 9, 1952 |